(12) United States Patent
Nakanishi et al.

(10) Patent No.: US 6,637,953 B2
(45) Date of Patent: Oct. 28, 2003

(54) LENS-BARRIER DEVICE FOR A CAMERA

(75) Inventors: Takao Nakanishi, Saitama (JP); Kenichi Shiba, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/154,778

(22) Filed: May 28, 2002

(65) Prior Publication Data

US 2002/0176714 A1 Nov. 28, 2002

(30) Foreign Application Priority Data

May 28, 2001 (JP) ........................................ 2001-158970

(51) Int. Cl.[7] .............................................. G03B 17/00
(52) U.S. Cl. ...................................... 396/448; 396/535
(58) Field of Search ................................. 396/349–350, 396/439, 448, 535

(56) References Cited

U.S. PATENT DOCUMENTS 5,819,127 A * 10/1998 Yokota ........................ 396/349
6,086,266 A * 7/2000 Fujisaki ....................... 396/448
6,257,776 B1 * 7/2001 Sakimoto .................... 396/448
6,347,893 B1 * 2/2002 Shiono et al. ............... 396/448
6,450,708 B1 * 9/2002 Takanashi ................... 396/448

FOREIGN PATENT DOCUMENTS

| JP | 9-68738 | 3/1997 |
|---|---|---|
| JP | 2000-155355 | 6/2000 |

* cited by examiner

Primary Examiner—D. Rutledge
(74) Attorney, Agent, or Firm—Sughrue Mion, PLLC (57) ABSTRACT

A camera is provided with a lens barrier moving between a closed position and an open position. The lens barrier is urged toward the open position by an urging mechanism, and is kept in the closed position by a locking mechanism. The urging mechanism urges the lens barrier with a compression spring. When the lens barrier is moved from the open position to the closed position, a movement amount thereof is reduced by a minimum length of the compression spring compressed in accordance with the movement of the lens barrier. In order to compensate the amount corresponding to the minimum length of the compression spring, a slider is provided. The slider is movable within a predetermined range together with the lens barrier when moving the lens barrier beyond the closed position.

17 Claims, 8 Drawing Sheets

MOVEMENT OF LENS BARRIER FROM OPEN POSITION TO CLOSED POSITION

FIG. 7B

MOVEMENT FROM CLOSED POSITION TO LOCK SWITCH POSITION

FIG. 7C

MOVEMENT FROM LOCK SWITCH POSITION TO CLOSED POSITION

MOVEMENT FROM CLOSED POSITION TO LOCK SWITCH POSITION

MOVEMENT FROM LOCK SWITCH POSITION TO OPEN POSITION

MOVEMENT FROM LOCK SWITCH POSITION TO OPEN POSITION

LENS-BARRIER DEVICE FOR A CAMERA

BACKGROUND OF THE INVENTION

1. Field of the Invention

The present invention relates to a lens-barrier device for a camera including a video camera, an electronic still camera, a photographic camera, and so forth. In particular, the present invention relates to a lens-barrier device for a camera provided with a lens barrier for protecting a taking lens.

2. Description of the Related Art

Cameras provided with a lens barrier for protecting a taking lens are disclosed in Japanese Patent Laid-Open Publication Nos. 9-68738 and 2000-155355. The lens barriers disclosed in these Publications are manually moved between a closed position for covering the taking lens and an open position for exposing the taking lens. Since the whole operation for moving the lens barrier to the open position is manually carried out, it is likely to miss a shutter chance. Moreover, a camera body is provided with a rail groove for movably supporting the lens barrier so that the rail groove appears on an outer surface of the camera to disfigure the camera.

In order to deal with the above disadvantages, it is desired that the camera is provided with a spring for assisting the lens barrier in moving to the open position. Further, it is desired to provide the rail groove on the lens barrier. However, if the rail groove is provided on the lens barrier, the lens barrier is likely to have a large size. As to the spring for urging the lens barrier toward the open position, if the spring is attached to the camera body, the exterior of the camera is marred. The reason for this is that the camera body needs a slot used for moving a connection member, which connects one end of the spring to the lens barrier. In view of this, the spring is attached to the lens barrier. However, in case the spring is a tension spring, it is impossible to contain the spring inside a contour of the lens barrier. Thus, it is desirable to employ a compression spring.

When the lens barrier is urged by the spring toward the open position, a locking mechanism is necessary for locking the lens barrier against the spring when the lens barrier is set to the closed position. In general, the well-known locking mechanism includes a lock release button or the like provided on the camera body. By handling this button, the locking mechanism is released.

Meanwhile, in the case the lens barrier is urged by the compression spring toward the open position, the compression spring intervenes between the lens barrier and the camera body. In this case, it is necessary to urge the lens barrier from the closed position toward the open position even when the lens barrier is set to the open position. By the way, when the lens barrier is set to the closed position, the compression spring is more compressed in comparison with the state in that the lens barrier is set to the open position. The compression spring has a limit of length at the time of compression. Thus, there is a shortcoming that a movement amount of the lens barrier is reduced by an amount corresponding to the limit length of the compression spring.

Further, when the lock release button is separately provided, production costs increase due to an interlocking mechanism for connecting the lock release button to the locking mechanism. In addition, since the interlocking mechanism is built in the camera body, there arises a problem in that a size of the camera body becomes larger.

SUMMARY OF THE INVENTION

In view of the foregoing, it is a primary object of the present invention to provide a lens-barrier device for a camera in which an exterior of the camera is prevented from being disfigured.

It is a second object of the present invention to provide a lens-barrier device for a camera in which a movement amount of a lens barrier increases.

It is a third object of the present invention to provide a lens-barrier device for a camera in which it is possible to downsize the camera.

It is a fourth object of the present invention to provide a lens-barrier device for a camera in which production costs of the camera may be reduced.

In order to achieve the above and other objects, the lens-barrier device according to the present invention comprises a mechanism for locking a lens barrier at a closed position, where a taking lens is covered therewith. After moving the lens barrier from an open position, where the taking lens is exposed, to the closed position, the lens barrier is further moved toward a lock switch position so as to pass across the closed position. In doing so, the lens barrier is locked at the closed position. Under this state, the lens barrier is moved again to the lock switch position to release the lens barrier locked at the closed position.

The lens-barrier device comprises another mechanism for urging the lens barrier toward the open position. This urging mechanism is constituted of compression springs, a press member, and a slider. The compression spring urges the lens barrier toward the open position. The press member abuts on one end of the compression spring, and is moved together with the lens barrier. The slider abuts on the other end of the compression spring, and is moved within a predetermined range together with the lens barrier when moving the lens barrier from the closed position to the lock switch position.

In the present invention, the locking mechanism locks the lens barrier by pushing it toward the lock switch position after moving the lens barrier from the open position to the closed position. Moreover, the locking mechanism releases the lock of the lens barrier by pushing the lens barrier again from the closed position to the lock switch position. It is possible to decrease production costs and to reduce a size in comparison with a case in that a lock release button is separately provided.

Further, the slider is provided so as to move together with the lens barrier when pushing the lens barrier from the closed position to the lock switch position. Consequently, a movement amount of the lens barrier is adapted to increase.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
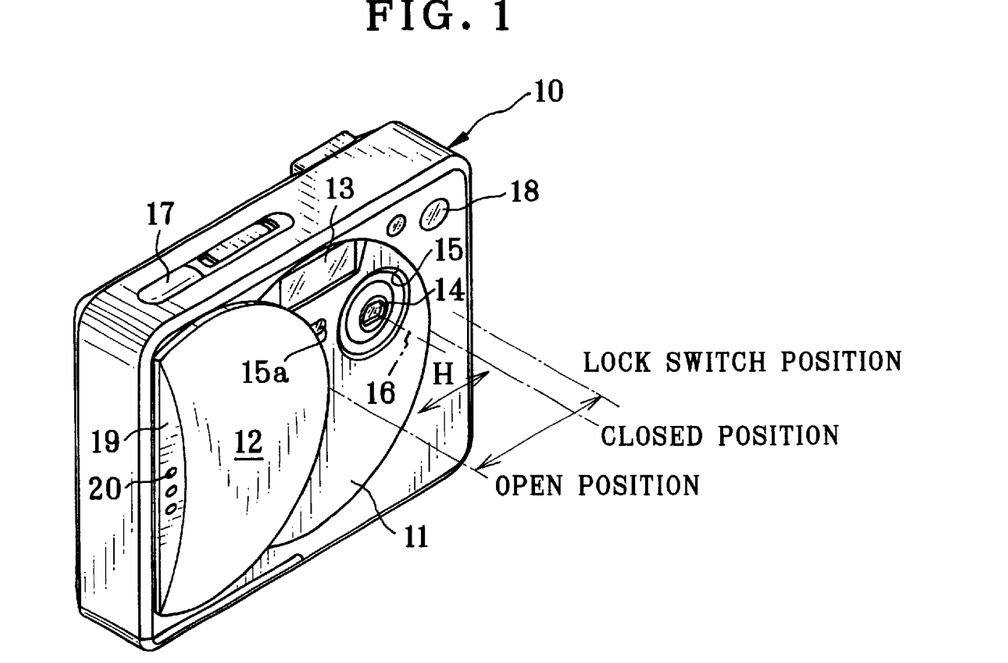
FIG. 1 is a perspective view of an electronic still camera according to the present invention, which shows a state in that a lens barrier is set to an open position.
Figure 2:
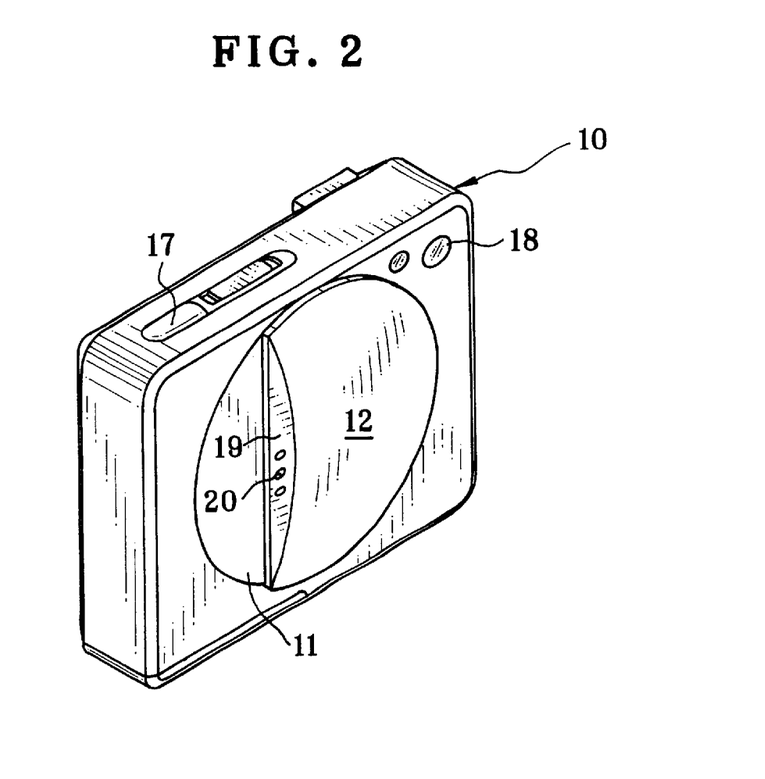
FIG. 2 is a perspective view of the electronic still camera, which shows a state in that the lens barrier is set to a closed position.

As shown in FIGS. 1 and 2, an electronic still camera 10 has a parallelepiped body, a front face of which is substantially a square. The parallelepiped body is provided with an attachment plate 11 of a circular shape. In front of the attachment plate 11, a lens barrier 12 of a half-moon shape is movably disposed. A diameter of the lens barrier 12 is identical with that of the attachment plate 11. This attachment plate 11 is made of a metal and has a flat front face in order to smoothly slide the lens barrier 12 thereon. A central-upper portion of the attachment plate 11 is provided with a flash window 13. Further, a right-upper portion of the attachment plate 11 is provided with a photographing window 15 through which a taking lens 14 is exposed.

The lens barrier 12 is slidable in a crosswise direction, shown by an arrow H in FIG. 1, relative to a photographic optical axis 16. In brief, the lens barrier 12 is slidable in a horizontal direction. When the lens barrier 12 is set to an open position shown in FIG. 1, the flash window 13 and the photographing window 15 are exposed. When the lens barrier 12 is set to a closed position shown in FIG. 2, the lens barrier 12 covers the flash window 13, the photographing window 15, and an LED 15a used for a self-timer. It is prevented to disfigure an exterior of the camera 10, since a rail groove and so forth for supporting the lens barrier 12 do not appear. Incidentally, reference numeral 17 denotes a shutter button, and reference numeral 18 denotes a viewfinder window.

The lens barrier 12 is manually opened and closed. The lens barrier 12 is urged toward the open position by an urging mechanism described later in detail. Against the urging mechanism, the lens barrier 12 is locked at the closed position by a locking mechanism described later in detail. After moving the lens barrier 12 from the open position to the closed position, the locking mechanism locks the lens barrier 12 at the closed position upon further pushing the lens barrier 12 toward a lock switch position beyond the closed position. By pushing the lens barrier 12 again from the closed position to the lock switch position, locking the lens barrier 12 at the closed position is released.

In this way, the lens barrier 12 is pushed in the same direction during both of the pushing operations for locking the lens barrier 12 at the closed position and for releasing the lock of the lens barrier 12. The lens barrier 12 is formed with a slope 19, which is positioned at a left side of a front face thereof in FIGS. 1 and 2, in order to make the pushing operation easy. The slope 19 is formed with a plurality of protrusions 20 used for putting a finger thereon.

Figure 3:
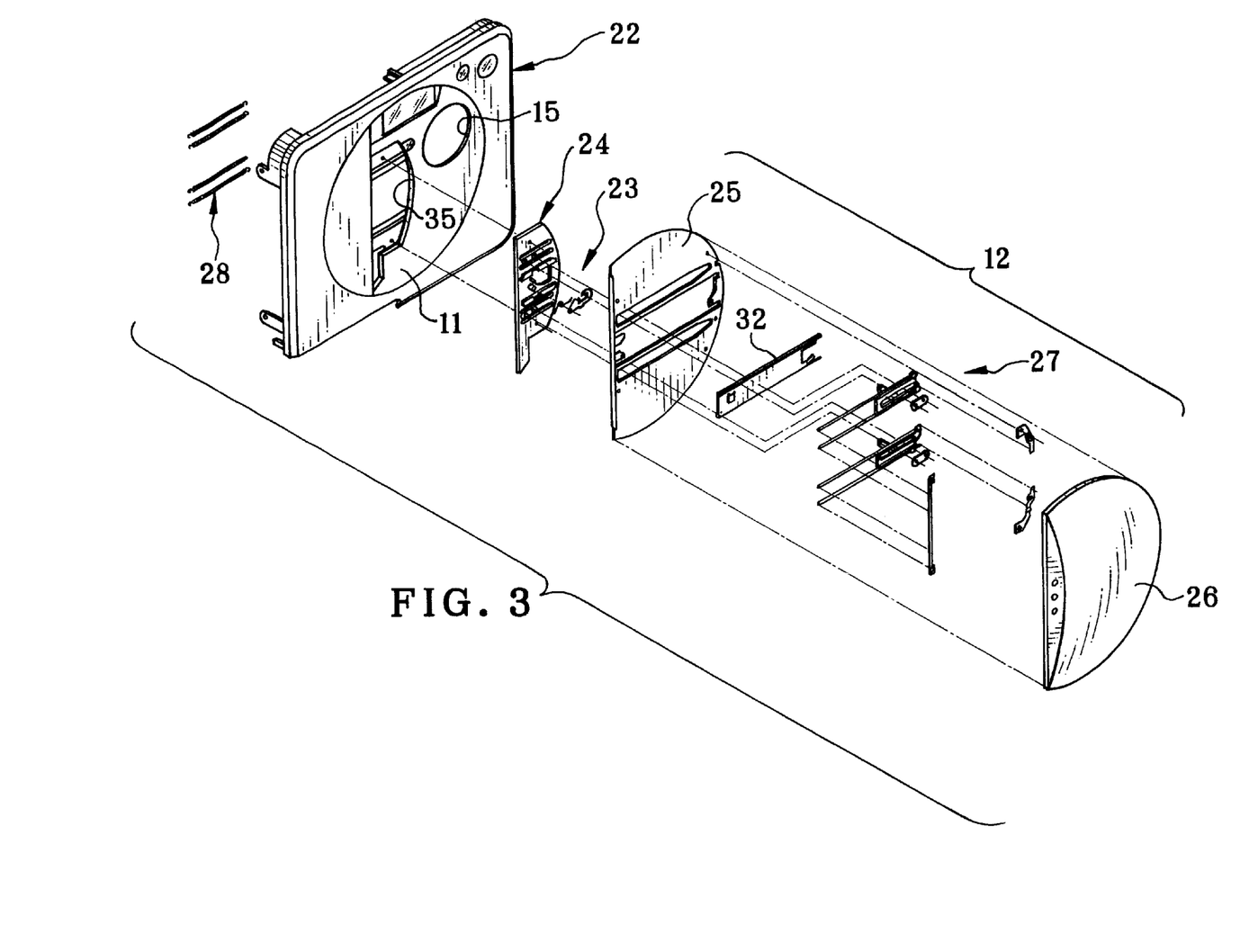
FIG. 3 is an exploded perspective view showing a lens-barrier mechanism and an urging mechanism.

A lens-barrier mechanism is constituted of the lens barrier 12, the locking mechanism, the urging mechanism, and a barrier guide. As shown in FIG. 3, a support member 24 on which the locking mechanism 23 is disposed is fixed to a front cover 22 of the camera 10. The lens barrier 12 is attached to the support member 24 so as to be slidable. The lens barrier 12 is constituted of a barrier plate 25, a barrier lid 26, and the urging mechanism 27 interposed between them. Incidentally, tension springs 28 constituting the urging mechanism 27 are attached to a rear face of the front cover 22.

Figure 4:
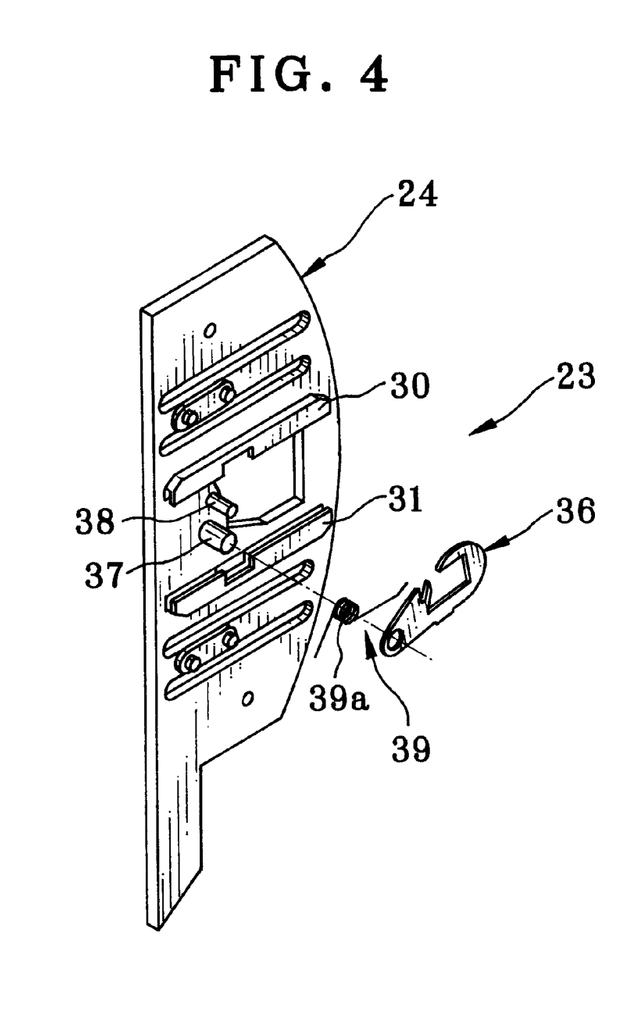
FIG. 4 is a perspective view showing a support member.
Figure 5:
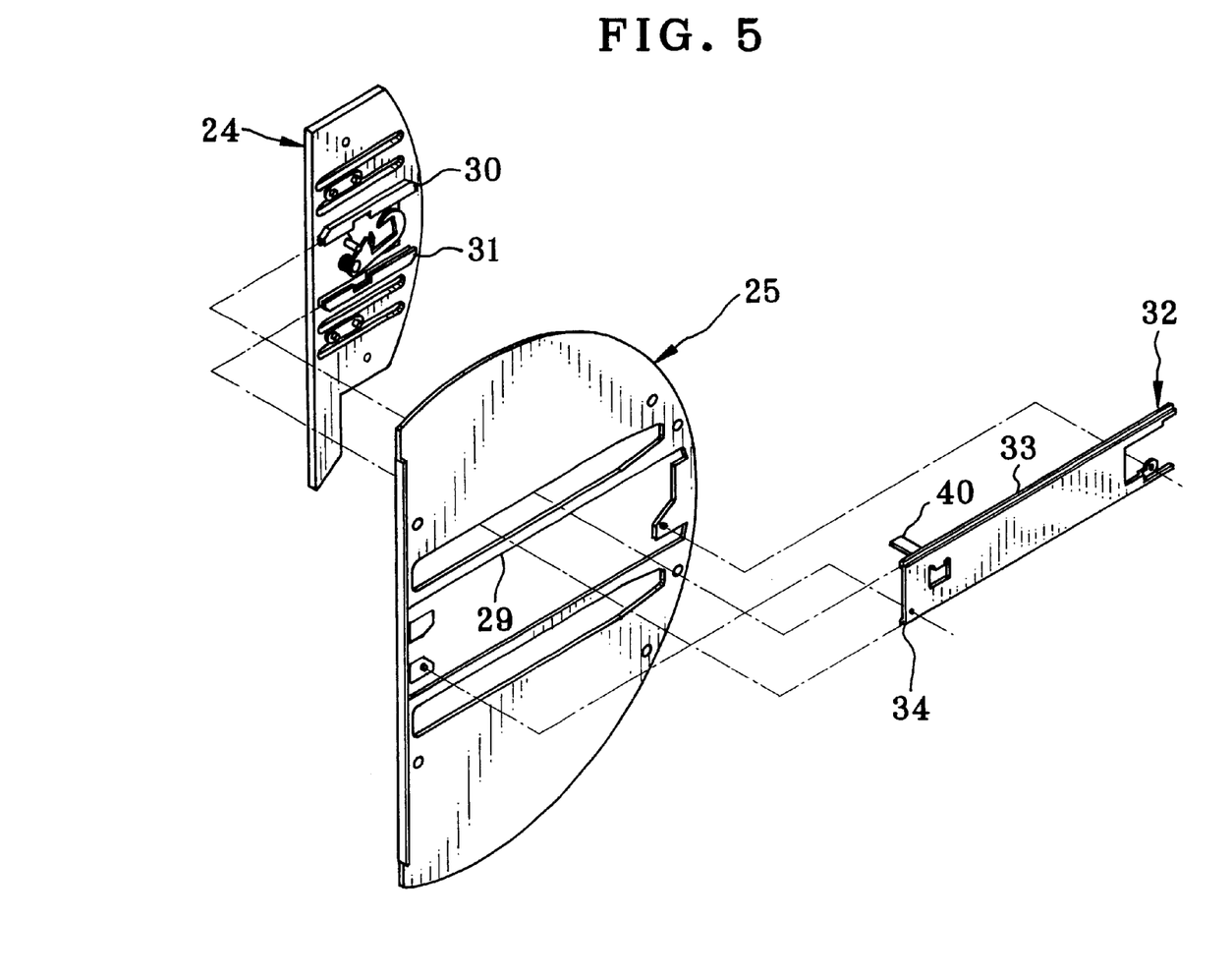
FIG. 5 is an exploded perspective view partially showing a structure for guiding the lens barrier.

The barrier guide is for slidably supporting the lens barrier 12 and is constituted of an upper rail receiver 30, a lower rail receiver 31, and a rail member 32 which are shown in FIGS. 4 and 5. The upper and lower rail receivers 30 and 31 are formed on the support member 24 and have a cross section of a U-like shape. Opening sides of the rail receivers 30 and 31 face each other.

Figure 6:
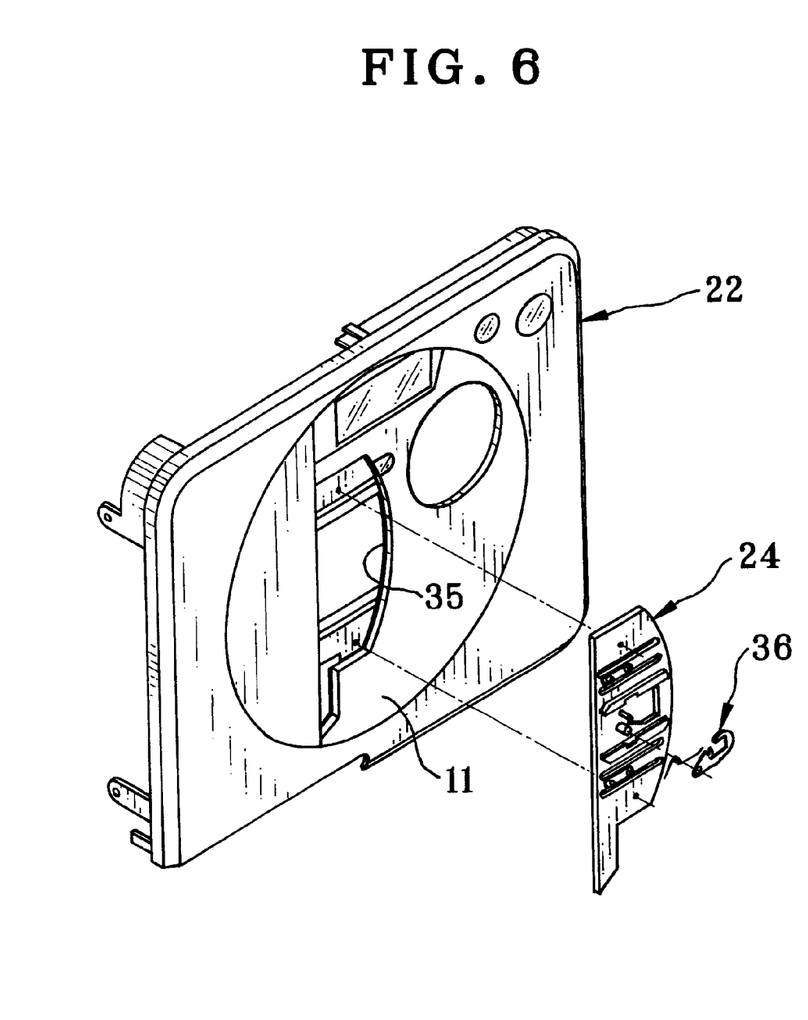
FIG. 6 is an exploded perspective view partially showing a relationship between the support member and a front cover.

As shown in FIG. 5, the rail member 32 is formed with an upper rail 33 and a lower rail 34. The upper and lower rail receivers 30 and 31 are respectively engaged with the upper and lower rails 33 and 34 through an opening 29 of the barrier plate 25. After that, the rail member 32 is fixed to the barrier plate 25 by means of caulking. The support member 24 is attached to an opening 35 formed in the attachment plate 11 such as shown in FIG. 6. The opening 35 is always covered with the lens barrier 12. The upper and lower rails 33 and 34 are arranged in the crosswise direction relative to the photographic optical axis 16. The barrier plate 25 is supported by the upper and lower rail receivers 30 and 31 so as to be slidable.

As shown in FIG. 4, the locking mechanism 23 is constituted of a lock claw 36 to be attached to the support member 24, a pin 37, a stopper 38, a torsion spring 39, and an engaging projection 40 shown in FIG. 5. The pin 37 is integrally formed with the support member 24 so as to protrude forward. The pin 37 is inserted into a coil portion 39a of the torsion spring 39, and is further inserted into the lock claw 36. After that, the top of the pin 37 is caulked to prevent the torsion spring 39 and the lock claw 36 from slipping out. The lock claw 36 is rotatable around the pin 37 and is movable in an axis direction of the pin 37 up to the top thereof.

The lock claw 36 is rotated around the pin 37 between a lock position and a lock release position. The torsion spring 39 urges the lock claw 36 toward the top of the pin 37 with the coil portion 39a. At the same time, one end of the torsion spring 39 urges the lock claw 36 toward the lock release position. The stopper 38 retains the lock claw 36 at the lock release position against the urging force of the torsion spring 39.

The engaging projection 40 is integrally formed with the rail member 32 so as to protrude backward, such as shown in FIG. 5. Upon pushing the lens barrier 12 from the open position, the engaging projection 40 rotates the lock claw 36 toward the lock position to retain it at the lock position.

Further, upon pushing the lens barrier 12 from the closed position, engagement of the lock claw 36 is released.

Figure 7A:
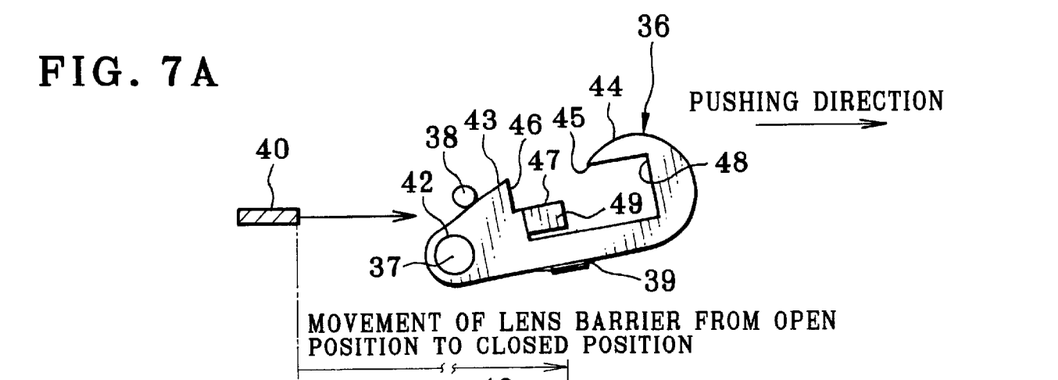
FIGS. 7A to 7D are explanatory illustrations showing operations of a locking mechanism, which respectively show the states in that the lens barrier is set to the open position, in that the lens barrier is moved to the closed position, in that the lens barrier is moved to a lock switch position, and in that the lens barrier is locked at the closed position.

As shown in FIG. 7A, the lock claw 36 has a hook-like shape. When the lens barrier 12 is set to the open position, the lock claw 36 abuts on the stopper 38 and is retained at the lock release position. The lock claw 36 comprises a bearing 42 rotatably supported by the pin 37, a slope 43, a first interceptor 44, a first cut portion 45, a hold portion 46, a second interceptor 47, a second cut portion 48, and a bent segment 49.

Figure 7B:
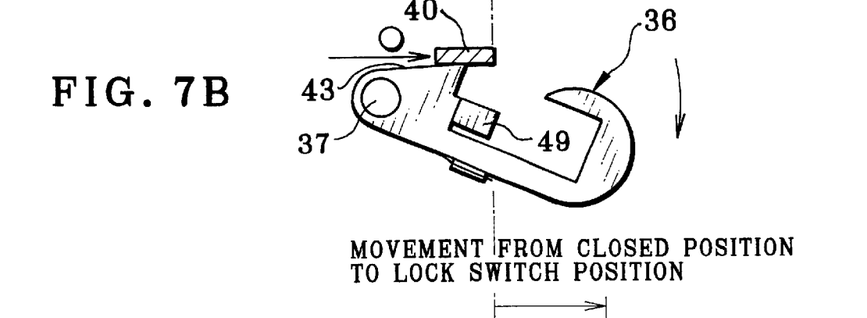
Figure 7C:
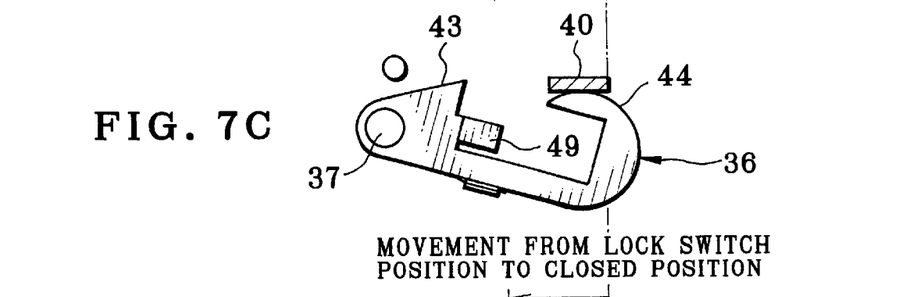
Figure 7D:
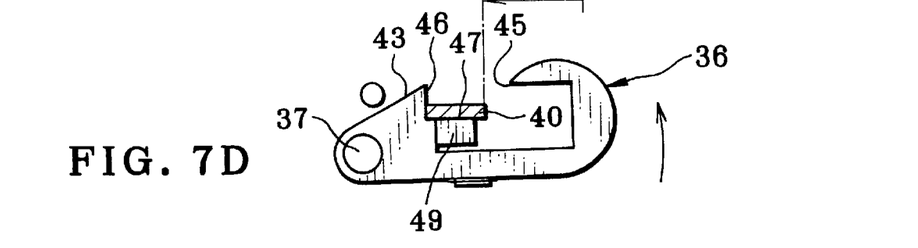

The engaging projection 40 is moved together with the lens barrier 12 and is urged by the urging mechanism 27 in a left direction in FIG. 7A, namely toward the open position. As the lens barrier 12 is moved from the open position, the engaging projection 40 abuts on the slope 43 first such as shown in FIG. 7B. Successively, the slope 43 is pushed by the engaging projection 40 to rotate the lock claw 36 toward the lock position. When the lens barrier 12 reaches the lock switch position, the first interceptor 44 abuts on the engaging projection 40, which has already overleapt the slope 43, from a lower side thereof such as shown in FIG. 7C. Owing to this, the lock claw 36 is prevented from rotating toward the lock release position.

The first cut portion 45 is formed by cutting a region lying between the slope 43 and the first interceptor 44. When the lens barrier 12 is returned from the lock switch position to the closed position, the lock claw 36 is slightly rotated toward the lock release position to put the engaging portion 40 into the lock member 36. When the engaging projection 40 enters the first cut portion 45, the hold portion 46 abuts on the engaging projection 40 against the urging mechanism 27 to keep the lens barrier 12 in the closed position. At this time, the second interceptor 47 abuts on the engaging projection 40 from a lower side thereof to make the engaging projection 40 abut on the hold portion 46 so that the lock claw 36 is prevented from rotating toward the lock release position.

Figure 8A:
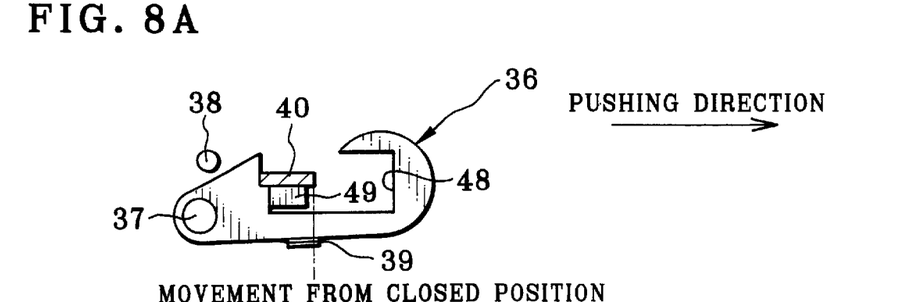
FIGS. 8A to 8F are explanatory illustrations showing operations of the locking mechanism, which respectively show the states in that the lens barrier is set to the closed position, in that the lens barrier is moved from the closed position to the lock switch position, in that the lens barrier passes the closed position, and in that a lock claw is pushed to permit a passage of an engagement projection.
Figure 8B:
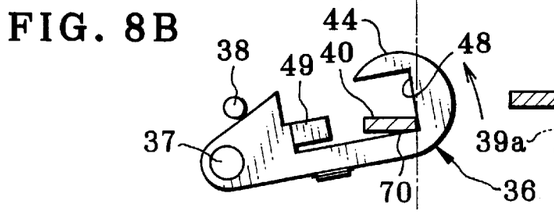

In this state, the lens barrier 12 is moved from the closed position toward the lock switch position by the pushing operation. Upon this operation, the engaging projection 40 disengages from the second interceptor 47 such as shown in FIG. 8B, and the lock claw 36 is rotated by the torsion spring 39 toward the lock release position. The second cut portion 48 abuts on the engaging projection 40 from the lower side thereof to stop the lock claw 36 at a rotational position where the bent segment 49 is located on a movement track of the engaging projection 40. When the lens barrier 12 is moved from the lock switch position toward the open position, the engaging projection 40 abuts on the bent segment 49 to avert the lock claw 36 in the axis direction of the pin 37 for permitting a passage of the engaging projection 40. Incidentally, the second interceptor 47 is an upper edge of the bent segment 49.

Figure 9:
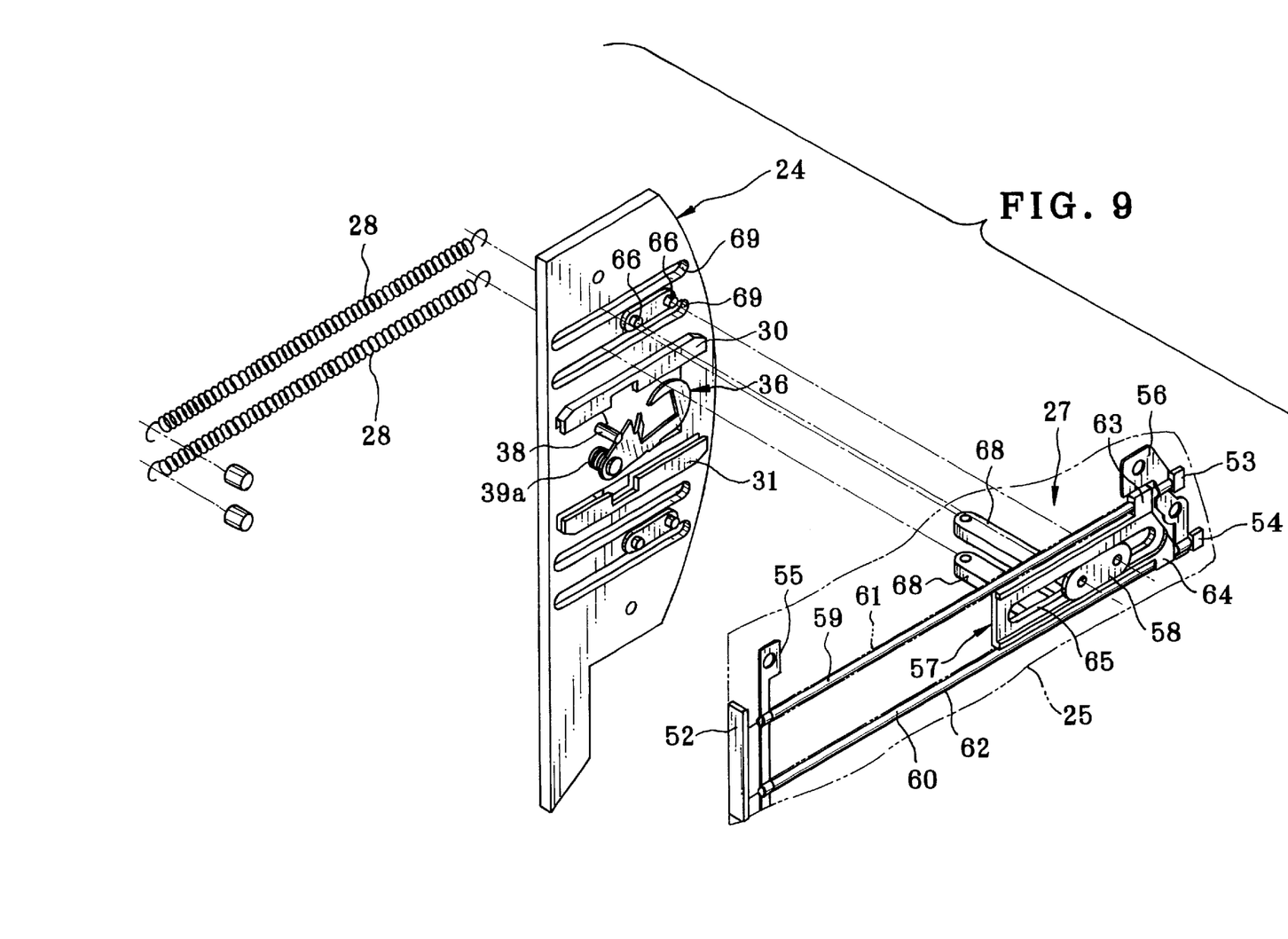
FIG. 9 is an exploded perspective view partially showing a schematic structure of the urging mechanism.

A pair of the urging mechanisms 27 is vertically provided at both sides of the rail member 32. As shown in FIG. 9, each of the urging mechanisms 27 is constituted of left and right stop members 52 to 54, left and right rod-fixing members 55 and 56, a slider 57, a slider retainer 58, first and second rods 59 and 60, two compression springs 61 and 62, the support member 24, and the two tension springs 28.

Both ends of the first and second rods 59 and 60 are fixed to the barrier plate 25 with the left and right rod-fixing members 55 and 56. The barrier plate 25 is integrally formed with the left and right stop members 52 to 54 abutting on both ends of the first and second rods 59 and 60. The stop members 52 to 54 regulate a movement of the rods 59 and 60 in an axis direction thereof. The slider 57 is formed with rod holders 63 and 64 into which the first and second rods 59 and 60 are respectively inserted. The slider 57 moves along the first and second rods 59 and 60 in a direction, which is identical with the movement direction of the lens barrier 12. The compression springs 61 and 62 are respectively set around the first and second rods 59 and 60 so as to contact with the left rod-fixing member 55 and the rod holders 63 and 64 of the slider 57. The left rod-fixing member 55 constitutes a press member of the present invention.

The slider 57 is provided with a slot 65 having a predetermined length and formed in the movement direction of the lens barrier 12. Pins 66 formed on the support member 24 are inserted into the slot 65. The slider retainer 58 is fixed to the tops of the pins 66 via the slot 65. Owing to this, the slider 57 is adapted to be movable relative to the support member 24, namely relative to a camera body, within a predetermined range in the movement direction of the lens barrier 12. Incidentally, the compression springs 61 and 62 urge the lens barrier 12 toward the open position.

The slider 57 is formed with a pair of spring hangers 68 projecting backward. The spring hanger 68 passes through a slit 69 of the support member 24. To the spring hanger 68, is attached one end of the tension spring 28 disposed behind the front cover 22. The other end of the tension spring 28 is attached to an inner wall of the front cover 22. In virtue of the tension spring 28, the slider 57 is urged so as to move the lens barrier 12 toward the open position.

Figure 10A:
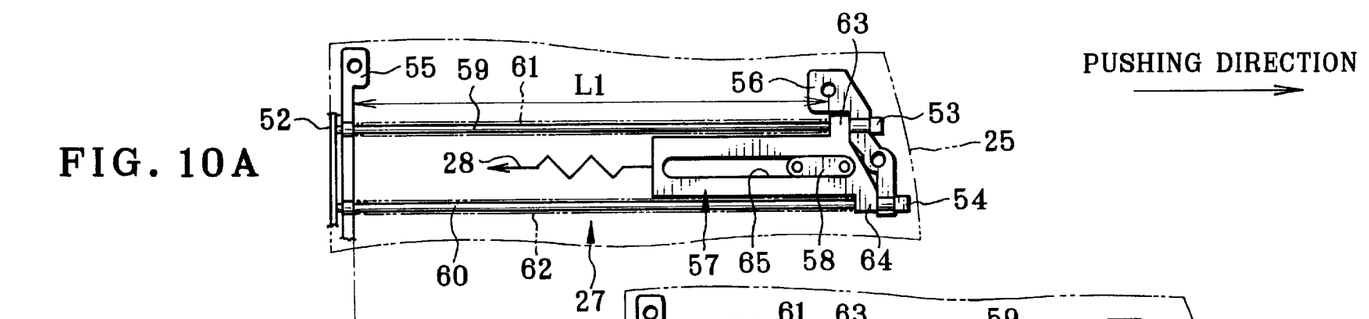
FIGS. 10A to 10C are explanatory illustrations showing operations of the urging mechanism, which respectively show the states in that the lens barrier is set to the open position, in that the lens barrier is moved to the closed position, and in that a slider is moved.

As shown in FIG. 10A, when the lens barrier 12 is set to the open position, one end of each of the compression springs 61 and 62 abuts on the left rod-fixing member 55. This end of the compression spring means an upstream end in the operational direction for pushing the lens barrier 12. The other ends of the compression springs 61 and 62 abut on the rod holders 63 and 64 of the slider 57 respectively. In this state, the length of the respective compression springs 61 and 62 is represented as L1. Incidentally, the slider 57 is urged by the tension spring 28 in the operational direction, and the slider retainer 58 is positioned at the right end of the slot 65.

Figure 10B:
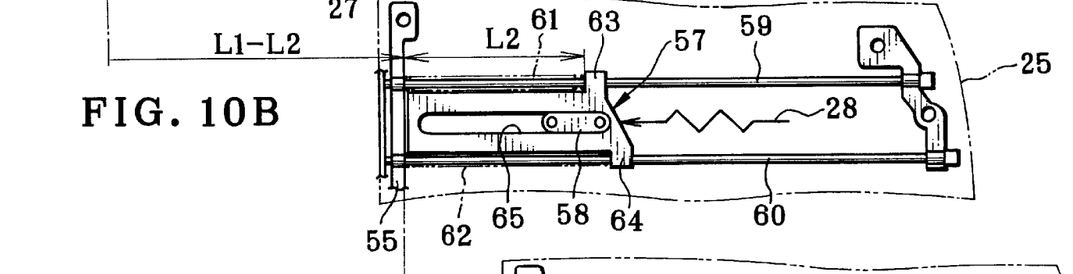
Figure 10C:
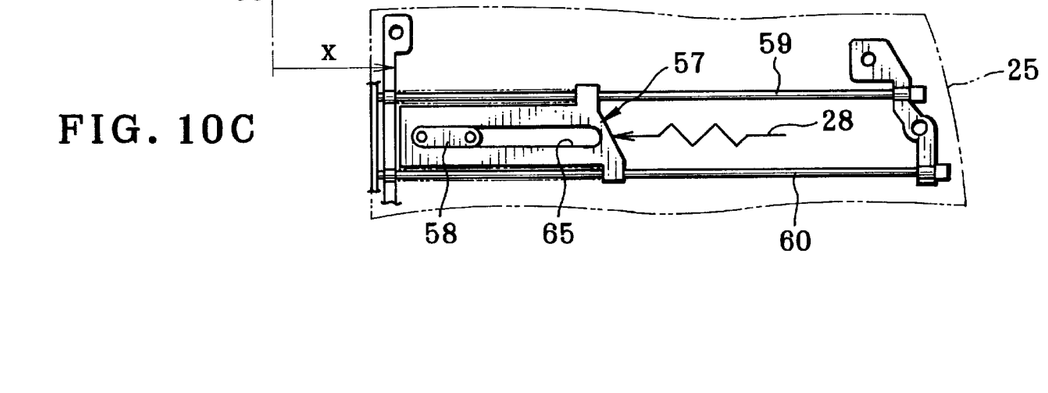

Upon moving the lens barrier 12 from the open position toward the closed position, the left rod-fixing member 55 presses the compression springs 61 and 62 relative to the rod holders 63 and 64 to shorten the length L1 of the compression springs 61 and 62. After the lens barrier 12 has passed across the closed position, the lens barrier 12 is moved to the lock switch position. At this time, the compression springs 61 and 62 has the minimum length L2, such as shown in FIG. 10B. As the length of the compression springs 61 and 62 is approximated to the minimum length L2, force for urging the slider 57 increases. When this force exceeds the urging force of the tension spring 28, the slider 57 is moved in the pushing direction. Consequently, the slider 57 is moved such that the slider retainer 58 approaches the left end of the slot 65. The slider 57 is moved by a certain length represented as X in FIG. 10C so that the lens barrier 12 is capable of moving more than a movement amount corresponding to the length L1 minus L2 of the compression springs 61 and 62.

The above-described urging mechanism 27 is disposed at each of the up-and-down sides of the rail member 32, and is covered with the barrier lid 26. By the way, the used compression springs 61 and 62 have a small diameter so as to be contained in a narrow space between the barrier plate 25 and the barrier lid 26. In general, when the compression spring having a small diameter and being longer than the length L1 is used, it is likely to cause settling of the spring by repeatedly compressing it for a long time. In the present embodiment, however, a compression load of the spring is reduced, since the slider 57 is adapted to move. Thus, the settling of the compression springs 61 and 62 may be prevented from occurring to some extent.

Next, an operation of the above structure is described below. As shown in FIG. 1, when the lens barrier 12 is set to the open position, the flash window 13 and the photographing window 15 are exposed. The locking mechanism 23 is kept in the lock release position such as shown in FIG. 7A in which the lock claw 36 abuts on the stopper 38 by means of the torsion spring 39. As to the urging mechanism 27, the slider 57 is urged by the tension spring 28 in the opposite direction to the pushing direction, and the slider retainer 58 is positioned at the right end of the slot 65, such as shown in FIG. 10A. At this time, the compression springs 61 and 62 have the length L1.

When the lens barrier 12 is pushed to move from the open position toward the closed position, the barrier plate 25 is moved in the pushing direction together with the left and right stop members 52 to 54 and the left and right rod-fixing members 55, 56. At this time, the left rod-fixing member 55 compresses the compression springs 61 and 62 relative to the rod holders 63 and 64 of the slider 57. As the lens barrier 12 moves, the compression springs 61 and 62 are compressed to the minimum length L2 to increase the urging force thereof, which urges the slider 57 via the rod holders 63 and 64. When the urging force of the compression springs 61 and 62 exceeds the urging force of the tension springs 28, the slider 57 is moved in the pushing direction. Consequently, the slider 57 moves such that the slider retainer 58 approaches the left end of the slot 65.

When the lens barrier 12 reaches the lock switch position, the compression spring is compressed so as to have the length L2. At this time, the slider 57 is located at the position where the slider retainer 58 abuts on the left end of the slot 65. In the present embodiment, the movement amount of the lens barrier 12 from the open position to the lock switch position is the total movement amount in which the length X of the movement of the slider 57 is added to the length L1 minus L2 of the compression springs 61 and 62.

When the lens barrier 12 passes the closed position, the engaging projection 40 provided on the rail member 32 abuts on the slope 43 to rotate the lock claw 36 toward the lock position, such as shown in FIG. 7B. Successively, the engaging projection 40 passes the slope 43. When the lens barrier 12 reaches the lock switch position, the engaging projection 40 is positioned on the first interceptor 44. Although the lock claw 36 is rotated toward the lock release position after the engaging projection 40 has passed the slope 43, the first interceptor 44 abuts on the engaging projection 40 from the lower side thereof. Thus, the lock claw 36 is prevented from rotating toward the lock release position, such as shown in FIG. 7C.

After that, the operation for pushing the lens barrier 12 is stopped, and a finger for pushing the lens barrier 12 is separated therefrom. Upon this, the lens barrier 12 is moved toward the closed position by means of the compression springs 61 and 62. At this time, the engaging projection 40 is also moved together with the lens barrier 12 in the same direction. Moreover, the lock claw 36 is rotated toward the lock release position by the torsion spring 39. Owing to this, the engaging projection 40 enters the first cut portion 45, and the hold portion 46 abuts on the engaging projection 40 so as to keep the lens barrier 12 in the closed position. Although the torsion spring 39 attempts to rotate the lock claw 36 toward the lock release position, the second interceptor 47 being as the top edge of the bent segment 49 abuts on the engaging projection 40 from the lower side thereof so that the lock claw 36 is prevented from rotating toward the lock release position.

When the lens barrier 12 is kept in the closed position, the photographing window 15 and the flash window 13 are covered therewith such as shown in FIG. 2.

For the purpose of moving the lens barrier 12 from the closed position to the open position, the lens barrier 12 is manually moved again in the direction extending from the open position to the closed position. In other words, the pushing operation for pushing the lens barrier 12 toward the lock switch position is carried out. In accordance with this operation, the engaging projection 40 is also moved together with the lens barrier 12 in the same direction. Concretely, the engaging projection 40 is moved from the position shown in FIG. 8A to the other position shown in FIG. 8B so that the engaging projection 40 is disengaged from the bent segment 49. Upon this, the torsion spring 39 rotates the lock claw 36 toward the lock release position. The lock claw 36 is rotated up to a position where the engaging projection 40 enters the second cut portion 48 located under the first interceptor 44. In other words, the rotation of the lock claw 36 is stopped at a position where the engaging projection 40 abuts on a lower portion 70 connecting the first interceptor 44 to the bent segment 49.

Figures 8C, 8E:
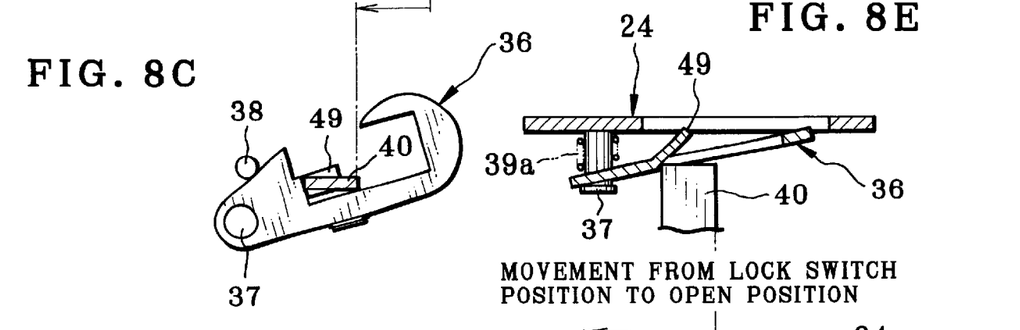
Figure 8D:
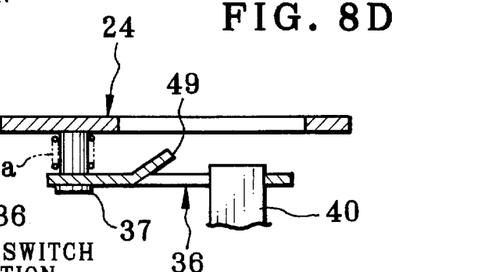
Figure 8F:
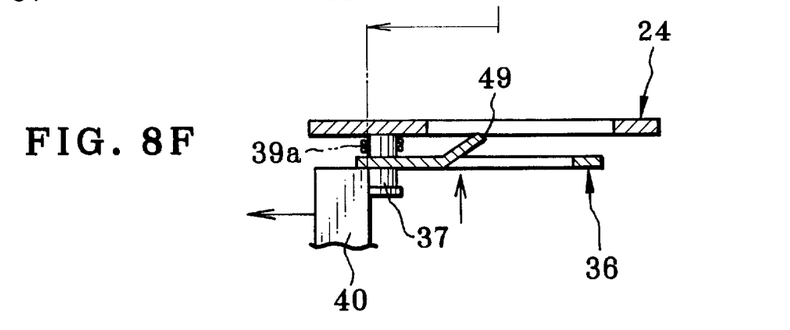

After pushing the lens barrier 12 from the closed position to the lock switch position, the finger pushing the lens barrier 12 is separated therefrom. Then, the lens barrier 12 is automatically moved toward the open position by means of the compression springs 61 and 62. During this movement, the engaging projection 40 runs on the front face of the bent segment 49 such as shown in FIG. 8E. Further, against the coil portion 39a, the engaging projection 40 presses the lock claw 36 via the bent segment 49 in an axis direction of the pin 37. Thus, the engaging projection 40 passes without being retained by the lock claw 36, such as shown in FIG. 8F.

As the lens barrier 12 is moved toward the open position, the compression of the springs 61 and 62 is gradually reduced. When the urging force of the tension spring 28 becomes stronger than the urging force of the compression springs 61 and 62, the slider 57 is moved in the urging direction of the tension spring 28. Finally, the lens barrier 12 is held at the open position in the state that the rod holders 63 and 64 of the slider 57 abut on the right rod-fixing member 56 and the slider retainer 58 abuts on the right end of the slot 65. Incidentally, in the above embodiment, the plural urging mechanisms 27 are provided. However, the sole urging mechanism 27 may be provided.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-barrier device for protecting a taking lens of a camera, comprising:

a lens barrier moving from an open position for exposing said taking lens to a closed position for covering said taking lens, said lens barrier being manually operated;

an urging member for urging said lens barrier toward the open position; and a locking mechanism for keeping said lens barrier in the closed position against said urging member, said locking mechanism holding said lens barrier in the closed position upon moving said lens barrier from the open position to a lock switch position passing across the closed position, and the hold of said lens barrier being released upon moving said lens barrier to the lock switch position again to return said lens barrier to the open position by means of said urging member.

2. A lens-barrier device according to claim 1, wherein said urging member is a compression spring.

3. A lens-barrier device according to claim 2, wherein said locking mechanism comprises:

an engaging projection integrally moving with said lens barrier;

a lock claw rotated by said engaging projection when said lens barrier is moved from the open position to the lock switch position through the closed position, said lock claw retaining said engaging projection to keep said lens barrier in the closed position upon moving said lens barrier from the lock switch position to the closed position; and a bent segment provided on said lock claw, said engaging projection passing said bent segment when said lens barrier moves toward the open position after moving to the lock switch position again, whereby the engagement of said lock claw and said engaging projection is released.

4. A lens-barrier device according to claim 3, wherein one end of said lock claw has a hook shape and the other end thereof is formed with a slope.

5. A lens-barrier device according to claim 4, wherein said lock claw is rotated by moving said engaging projection along said slope.

6. A lens-barrier device according to claim 5, further comprising:

a stopper for abutting on said slope, said stopper regulating the movement of said lock claw when said lens barrier is set to the open position.

7. A lens-barrier device according to claim 6, further comprising:

a torsion spring for urging said lock claw toward said stopper.

8. A lens-barrier device according to claim 7, further comprising:

a support member for supporting said lock claw such that said lock claw is attached to said support member via said torsion spring.

9. A lens-barrier device according to claim 8, wherein said engaging projection pushes said bent segment against a coil portion of said torsion spring when said engaging projection passes along said bent segment.

10. A lens-barrier device for protecting a taking lens of a camera, comprising:

a lens barrier moving between an open position for exposing said taking lens and a closed position for covering said taking lens; and an urging mechanism for urging said lens barrier toward the open position, wherein said urging mechanism comprises:

a compression spring for urging said lens barrier toward the open position;

a press member for abutting on one end of said compression spring, said press member moving together with said lens barrier and pressing said compression spring; and a slider for abutting on the other end of said compression spring, said slider being associated with said lens barrier and moving in a movement direction of said lens barrier within a predetermined range when said lens barrier is moved beyond the closed position.

11. A lens-barrier device according to claim 10, wherein said slider is supported by a pair of rods and said compression spring is disposed around each of said rods.

12. A lens-barrier device according to claim 11, wherein said rod is inserted into a rod holder provided on said slider, and the other end of said compression spring abuts on said rod holder.

13. A lens-barrier device according to claim 12, further comprising:

a tension spring for urging said slider toward the open position, said slider moving against said tension spring when said lens barrier moves beyond the closed position.

14. A lens-barrier device according to claim 13, wherein said slider is formed with a slot extending in the movement direction of said lens barrier.

15. A lens-barrier device according to claim 14, further comprising:

a slider retainer for regulating the movement of said slider, said slider retainer entering said slot to regulate the movement of said slider within said predetermined range by abutting on both ends of said slot.

16. A lens-barrier device according to claim 15, further comprising:

a locking mechanism for keeping said lens barrier in the closed position against said urging mechanism.

17. A lens-barrier device according to claim 16, wherein a pair of said urging mechanisms are disposed at up-and-down sides of said locking mechanism.

* * * * *